April 25, 1967  P. L. CELLINI  3,315,829
SELF-LOADING STRADDLE TRUCK
Filed Sept. 1, 1965  2 Sheets-Sheet 1
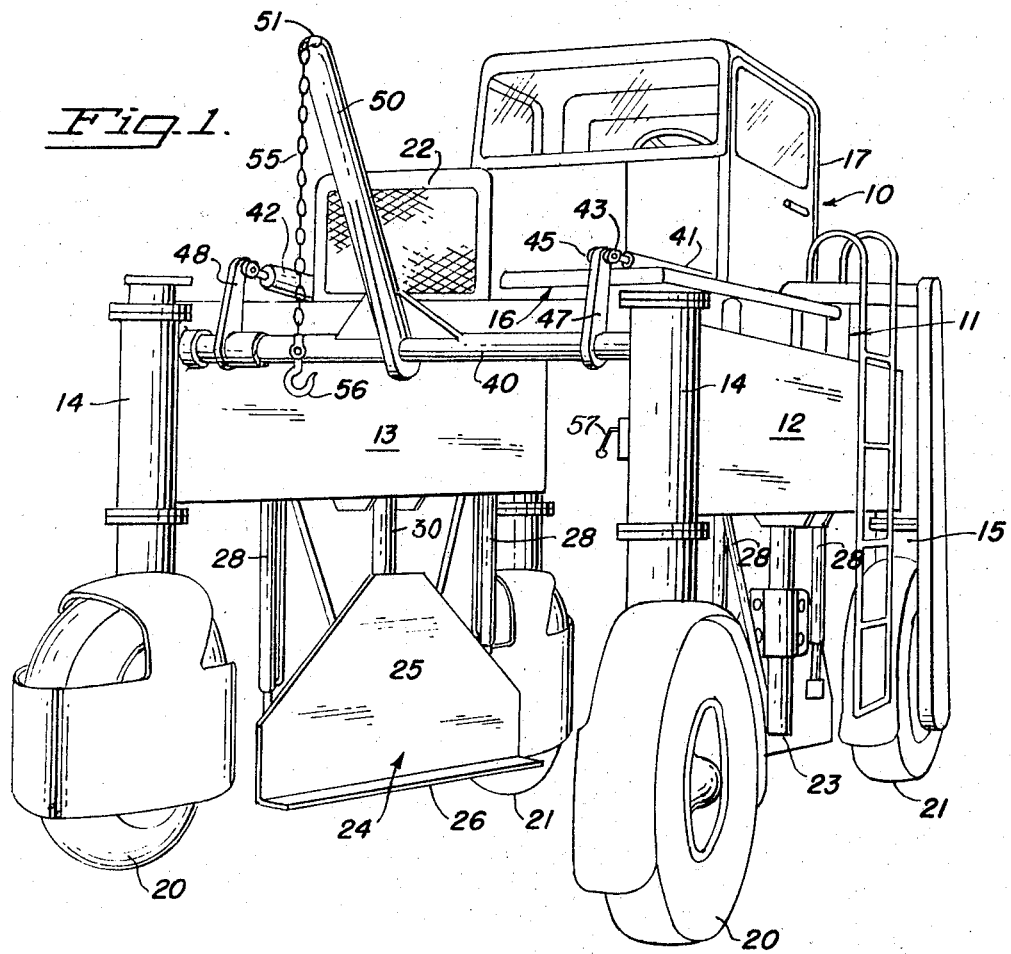
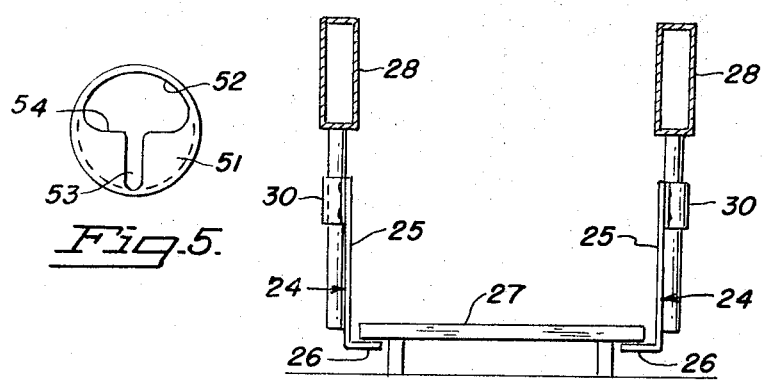
INVENTOR
PLINIO L. CELLINI
BY
Owen, Wickersham & Erickson
ATTORNEYS

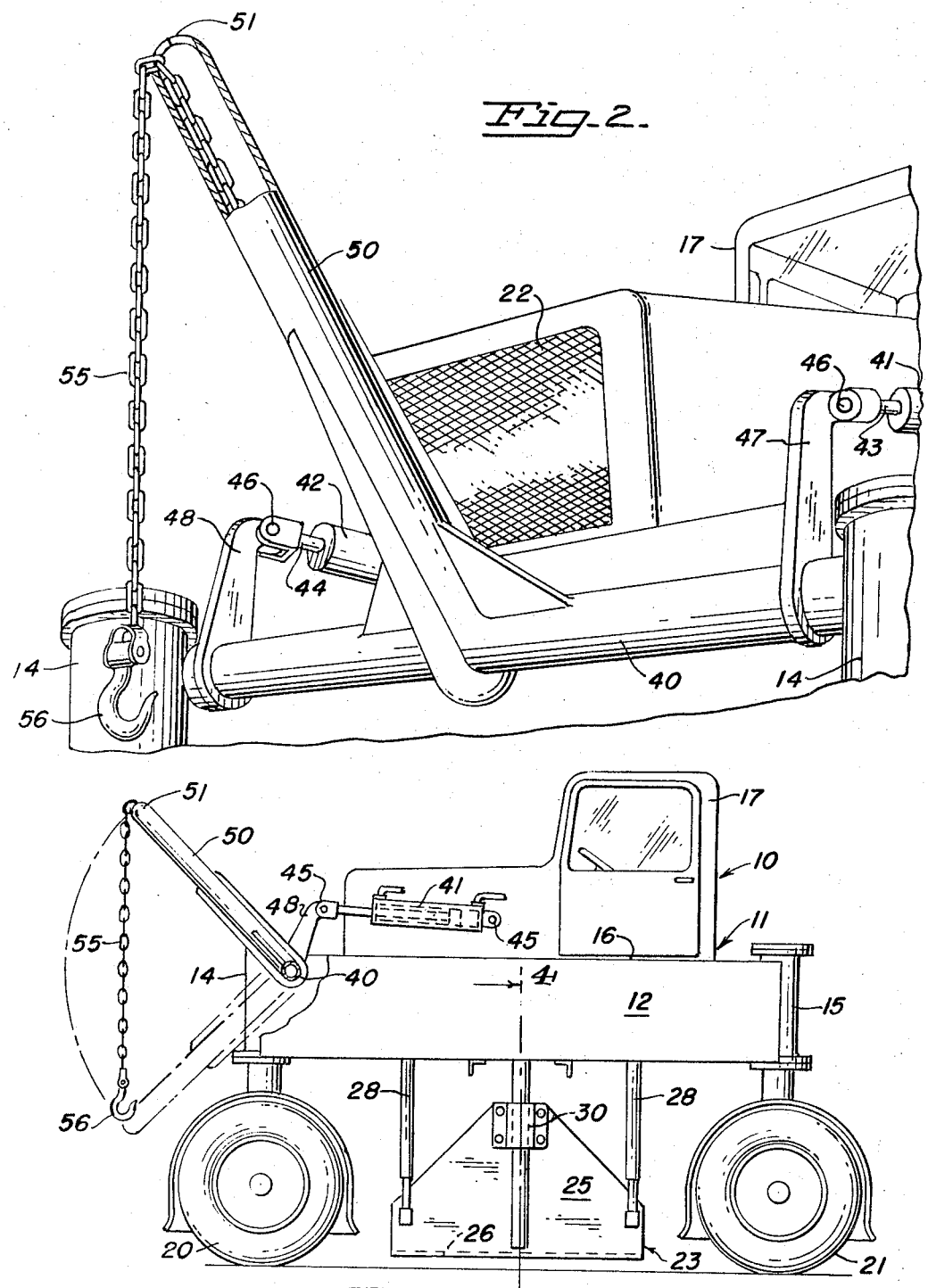

United States Patent Office 3,315,829
Patented Apr. 25, 1967

3,315,829
SELF-LOADING STRADDLE TRUCK
Plinio L. Cellini, Concord, Calif., assignor to Tidewater Oil Company, Los Angeles, Calif., a corporation of Delaware
Filed Sept. 1, 1965, Ser. No. 484,275
6 Claims. (Cl. 214—392)

This invention relates to an improved straddle truck and to improvements in straddle trucks.

In straddle trucks the load is carried in the center beneath a high cab which straddles two side members. These well-known trucks are used for carrying lumber and other materials on pallets. Straddle trucks have two vertical side members with wheels at both their front and rear ends; a cross means joins the side members across the top, the cross means including a high control cab. The side members extend forward of the cross means and the cab, and the wheels support the frame and enable motive power to be applied for moving the load. Pallet engaging means are suspended from each side member in between its forward and rear wheels and they usually include a pair of lifting members, typically L-shaped in cross section, that are swung in to engage beneath the pallet or box which is supporting the load. When they are hydraulically lifted to raise the load off the ground, the load can be transported.

These straddle trucks are very useful, but they have one difficulty, they cannot carry loads except on pallets or boxes that can be engaged by the pallet-engaging means. Therefore, any load that they are to carry has to be placed on a pallet or in a box, and this is often not possible to do manually. For example, very heavy loads, which the truck is quite capable of carrying, cannot ordinarily be loaded by one or two or even three men by manual power alone. Hence, the truck has had to be accompanied by a crane which did nothing but lift the load onto the pallet and then either went elsewhere or accompanied the straddle truck to the end of the journey to unload the load from the pallet onto a dolly or to the ground. The procedure has usually meant that either the crane was tied up as an additional piece of equipment during the entire loading, transporting, and unloading operation or that someone had to wait at each end until the crane was available for doing its brief job. In any event, it has been a very inefficient use of the crane, and it was annoying that the straddle loader itself was incapable of doing the entire job and of carrying with it suitable equipment for completing the job.

An object of the present invention is to solve this problem by providing a straddle truck with means capable of performing the short-term jobs of lifting loads on and off pallets or into and out from boxes, so that the straddle truck can both carry them and load and unload them. In other words, the straddle truck of this invention is self-loading, in the sense that it places articles on the pallet, carries the pallet, and then unloads the pallet. Of course, this is not always necessary, but it is extremely helpful when transporting machines and other heavy equipment which is in one piece and cannot be built up manually into a heavy load, as lumber can, for example.

Another object of the invention is to provide a self-loading straddle truck capable of adaptation to loads of different heights. This is important because many of these pieces of heavy equipment are taller than others, and a loading arrangement which had no flexibility would be limited in its usefulness.

Other objects and advantages of the invention will appear from the following description of a preferred embodiment.

In the drawings:

FIG. 1 is a view in perspective of a straddle truck embodying the invention and incorporating a crane sub-assembly on its forward end; in this view the crane sub-assembly is shown in its elevated position.

FIG. 2 is a fragmentary enlarged perspective view of the crane sub-assembly and nearby portions.

FIG. 3 is a view on a reduced scale and in side elevation of the straddle truck. The crane sub-assembly is shown in solid lines in an upper position, while in broken lines it is shown in a lower position.

FIG. 4 is a fragmentary view in section taken along the line 4—4 in FIG. 3.

FIG. 5 is a fragmentary enlarged view of the outer end of the crane post.

The straddle truck 10 shown in the drawings comprises a main frame 11 which includes two vertical side members 12 and 13, each having a forward end 14 and a rear end 15. Cross means 16 extend across the top of the two side members 12 and 13 and join them together and support a high control cab 17, which comprises part of the cross means 16. This construction enables the truck 10 to carry a load nearly as high as the height of the cross means 16 above the ground, for the space below the cross means 16 and between the two side members 12 and 13 is completely unimpeded. Each of the side members 12 and 13 extends forward of the cab 17 and of the cross means 16. The forward wheels 20 are preferably located beneath the forward ends 14 of the side members 12 and 13, and the rear wheels 21 are preferably located beneath the rear ends 15 of the side members. The cab 17 carries an engine 22 having a suitable conventional transmission and so on to provide motive means for driving the wheels 20 and 21. Usually all the wheels 20 and 21 are powered and are all steerable.

The truck 10 has a pair of pallet-engaging means 23 and 24, one being suspended from each side member 12 and 13 in between its forward wheels 20 and the rear wheels 21. Each pallet-engaging means 23, 24 includes a vertically extending plate 25, which may be trapezoidal in shape, and a bottom flange 26 which extends inwardly and serves to grasp and support a suitable pallet 27 (or other suitable container or support) as shown in FIG. 4. The pallet-engaging means 23 and 24 are controlled by a hydraulic system typically including four cylinders 28, two for each of the pallet-engaging means, one at its forward end and one at its rear end. A guide and support tube 30 is secured to the outside of each plate 25, and each side member 12, 13 has a guide rod that is slidable up and down in the tube 30.

In ordinary operation, the operator has his side members 23 and 24 retracted when he approaches a pallet 27 or a box, and then he operates his hydraulic circuit to force the pallet-engaging means 23, 24 inwardly to engage beneath the pallet 27 with the flange 26. Then he lifts them with the cylinders 28, so that they hold the pallet 27 or box a short distance off the ground, enough to prevent them from striking bumps in the road. When the load is thus lifted, it can be transported wherever desired.

As stated before, the difficulty with the straddle truck 10, as so far described, is that the load has to be placed on the pallet 27 or box. Whereas, for lumber and other loads embodying small increments, loading is an easy job, it is a very difficult one when heavy machinery is to be transported. The present invention however, solves this problem.

A laterally extending shaft 40 is rotatably mounted forward of the cab 17 and forward of the entire cross means 16 and bridges the top of the side members 12 and 13. It is located at the same level as the bottom portion of the cross means 16 or slightly thereabove so that there is no reduction in the possible height of a load. Hydraulic means are provided for rotating this shaft 40 approximately 90°. These means may comprise a pair of hydraulic cylinders 41 and 42, each with a piston and a connecting rod 43, 44. Each hydraulic cylinder 41, 42 is rotatably mounted to the frame 11 by a swivel 45 at its rear end, so that it can rise and fall, and is also pivotally mounted at its forward end by a joint 46 to arms 47 and 48 which are rigidly connected to the shaft 40. Thus, the application of hydraulic fluid acts to rotate the shaft 40 preferably over a range of approximately 90°.

Rigidly secured to the center of the shaft 40 is a tubular post 50 which extends perpendicularly out from the shaft 40—in other words, it extends and acts in a direction generally axial of the straddle truck 10 and extends generally forwardly. It is rotatable from an upper position (solid lines, FIG. 4) slightly forward of perpendicular to a position slightly lower than horizontal (broken lines, FIG. 4), to enable the best handling of a load. The post 50 is rigidly supported on the shaft 40, and the entire unit is made so that it can withstand the gentle type of lifting a heavy piece of equipment a few inches. The sub-assembly need not be designed to withstand the shocks and vibration that it would have to encounter if it were used to *transport* the equipment a long distance or to lift it very high. The position of the unit forward of the cab 17 helps to provide a good center of gravity, so that it is weighted by the remainder of the truck 20 and is thus able to lift loads without raising the rear wheels 21 of the straddle truck 10.

The actual lifting involves a suitable flexible load supporting means, which may be a chain or a cable with a winch or a gear-type drive. The post 50 may be a hollow tube provided at its forward end 51 with an opening 52 which is contoured to provide a vertical chain-link stop slot 53 and an upper, larger more horizontal hole 54 through which a chain 55 can be moved back and forth freely. The chain 55 is arranged so that much of it can be housed within the post 50. Yet it can be adjusted instantly by simply lifting one link out of the slot 53, moving the chain 55 and then dropping in a different link, so that it can be made to engage any height of load. The outer end of the chain 55 is provided with a hook 56 or other suitable load-engaging means. Cable, if used, may be similarly equipped.

In use, the straddle truck 10 is driven adjacent to the load to be lifted, which may be either on the ground or floor or on a hand truck. A pallet 27 is also brought near to the unit. The straddle truck operator uses the hydraulic cylinders 41 and 42 to cause rotation of the shaft 40 and to lower the tubular post 50 to its lower position (FIG. 4), preferably slightly below horizontal. A ground man may then affix the hook 56 to a suitable part of the load to be lifted and may measure the chain 55 such that it is at the proper height for the most efficient lifting. He may do this by lifting a chain link out of the vertical slot 53 and then either pulling more chain 55 out or pushing more into the tubular post 50, and then re-engaging a chain link in the slot 53 to provide a firm anchorage. The operator of the straddle truck then reverses the hydraulic circuit to pull in the rods 41, 42 and cause the shaft 40 to rotate in the direction which lifts the post 50 and thereby the chain 55 and hook 56 and therewith the object which is to be transported. It usually need be lifted only a few inches and then someone can push the pallet 27 beneath it; then the straddle truck operator can lower the load to the pallet, disconnect the hook 56, drive the truck 10 forward, and lift the pallet 27 with the pallet-engaging means 23 and 24.

The straddle truck operator can do all this work alone, especially by the use of a duplicate control device 57 that can be reached from the ground level. Thus, he can actuate the control device 57 to lower the chain 55, lock the hook 56 to the object, the pallet 27 being located at a suitable position nearby. Then he can actuate the control 57 to raise the article, slip the pallet 27 under it, and actuate the control 57 to lower the object to be transported to the pallet. Then he can unhook the unit, return to his cab, raise the post 50, lift the pallet with the means 23 and 24, and go on his way.

At the end of the journey, the object may be lifted off the pallet by first depositing the pallet 27 on the ground and then backing the truck 10 from it, engaging the hook 56 as before, and lifting. Helpers may remove the pallet 27 and place a suitable dolly beneath the load or the load may be lowered into place on the ground, if that is what is desired. Once again, the straddle truck operator could do this entire job alone, if it were necessary or desirable.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a straddle truck having a main frame comprising two vertical side members, each having a forward end and a rear end, and cross means at the top joining said side members and including a high control cab, said side members each extending forward of said cross means and cab, wheels supporting said frame and including forward wheels at and beneath the forward end of each said side member and rear wheels at and beneath the rear end of each said side member, motive means for driving said wheels, pallet-engaging means suspended from each said side member in between its forward and rear wheels, for grasping and lifting and supporting the side edges of a pallet for carrying a load thereon, and first hydraulic means for positioning said pallet-engaging means, the combination therewith of pallet-loading means, comprising:

a laterally extending shaft rotatably mounted forward of said cab and cross means and bridging the top of said side members at a level at least as high as the bottom of said cross means, second hydraulic means for rotating said shaft approximately 90°, a forwardly generally axially extending tubular post extending out from the center of said shaft for motion between an upper position and a lower position as a result of rotation of said shaft, and having a chain-housing cavity and having an outboard end with chain-locking means, a chain partly in said cavity and locked to said chain-locking means and extending out from said post, and a load-engaging hook on the distal end of said chain, so that said hook can be connected to a heavy load with said post in a lower position and the chain nearly taut and then said post raised to an upper position to lift said load and said truck may then be moved to carry said load over a pallet when said load can be lowered on to said pallet and said chain unhooked therefrom, said pallet subsequently being lifted and carried by said pallet-engaging means.

2. The combination of claim 1 having control for said second hydraulic means secured to said frame at a height reachable by a man standing on the ground.

3. In a straddle truck having a main frame comprising two vertical side members, each having a forward end and a rear end, and cross means at the top joining said side members and including a high control cab, said side members each extending forward of said cross means and cab, forward wheels at and beneath the forward end of each said side member and rear wheels at and beneath the rear end of each said side member, motive means for driving said wheels, pallet-engaging means suspended from each said side member in between its forward and rear wheels, for grasping and lifting and supporting the side edges of a pallet for carrying a load thereon, and hydraulic means for positioning said pallet-engaging means, the combination therewith of pallet-loading means, comprising:

a laterally extending shaft rotatably mounted forward of said cab and cross means and bridging the top of said side members, power means for rotating said shaft over a sector, a forwardly generally axially extending post extending from said shaft for motion between an upper position and a lower position as a result of rotation of said shaft and having an outboard end, a chain locked to said outboard end and extending therefrom, and load-engaging means on said chain, so that said chain can be connected to a heavy load with said post in a lower position and then said post raised to an upper position to lift said load so that it can be deposited on a pallet, said pallet subsequently being lifted and carried by said pallet-engaging means.

4. The combination of claim 3 having control means for said power means in said control cab and duplicate control means secured to one said side member at a height operable by a man standing on the ground beside said truck.

5. In a straddle truck having two vertical side members with wheels beneath each end and joined by cross means at the top and having hydraulically operated pallet-engaging means suspended from each said side member in between its forward and rear wheels, for grasping and lifting and supporting the side edges of a pallet for carrying a load thereon, the combination therewith of pallet-loading means, comprising:

a laterally extending rotatable shaft forward of said cross means and bridging the top of said side members, power means for rotating said shaft through a desired angle, a forwardly generally axially extending post extending out from said shaft to an outboard end, and load supporting means extending down from said outboard end.

6. The combination of claim 5 having control means for said power means secured to one of said side members for operation by a man standing on the ground.

References Cited by the Examiner

UNITED STATES PATENTS 1,786,060 12/1930 Greaves et al. _____ 214—392
2,008,324 7/1935 Grab _____ 214—392 X GERALD M. FORLENZA, *Primary Examiner.*

A. MAKAY, *Assistant Examiner.*